US009648854B1

(12) United States Patent
Reiter

(10) Patent No.: US 9,648,854 B1
(45) Date of Patent: *May 16, 2017

(54) ANIMAL EXERCISE SYSTEM IN FORM OF A GAME

(71) Applicant: Alyssa Reiter, Birmingham, MI (US)

(72) Inventor: Alyssa Reiter, Birmingham, MI (US)

(*) Notice: Subject to any disclaimer, the term of this patent is extended or adjusted under 35 U.S.C. 154(b) by 671 days.

This patent is subject to a terminal disclaimer.

(21) Appl. No.: 13/887,714

(22) Filed: Aug. 12, 2013

Related U.S. Application Data

(63) Continuation of application No. 13/328,443, filed on Dec. 16, 2011, now Pat. No. 8,434,428.

(60) Provisional application No. 61/424,178, filed on Dec. 17, 2010.

(51) Int. Cl.
*A01K 15/02* (2006.01)

(52) U.S. Cl.
CPC .......... *A01K 15/027* (2013.01); *A01K 15/025* (2013.01)

(58) Field of Classification Search
CPC .... A01K 15/027; A01K 15/02; A01K 15/025; A63H 33/04; A63H 33/42; B65D 81/365; A63F 3/0023; A63F 3/00895; A63F 2003/00233
USPC ....... 119/703, 707, 702, 708, 709, 710, 711; 446/476, 478, 76, 75; 273/285, 286, 284
See application file for complete search history.

(56) References Cited

U.S. PATENT DOCUMENTS

| | | | | |
|---|---|---|---|---|
| 4,267,799 A | * | 5/1981 | Bacon ................... | A01K 5/0275 119/61.2 |
| 5,054,427 A | * | 10/1991 | Hoover .................. | A01K 1/031 119/416 |
| 5,524,326 A | * | 6/1996 | Markowitz .......... | A01K 15/025 119/482 |
| 5,536,007 A | * | 7/1996 | Snyder ..................... | A63F 7/04 119/702 |
| 5,997,001 A | * | 12/1999 | Doss ................... | A63F 3/00041 273/277 |
| 6,203,017 B1 | * | 3/2001 | Schultz ................. | A63F 3/0023 273/236 |
| 2007/0283899 A1 | * | 12/2007 | Genitrini .............. | A01K 15/025 119/708 |
| 2009/0056640 A1 | * | 3/2009 | Gross ..................... | A01K 15/02 119/702 |
| 2010/0242857 A1 | * | 9/2010 | Newman ............... | A01K 15/025 119/707 |
| 2010/0275855 A1 | * | 11/2010 | Ottosson .............. | A01K 5/0114 119/707 |
| 2011/0041775 A1 | * | 2/2011 | Ussen .................. | A01K 15/027 119/702 |
| 2012/0174874 A1 | * | 7/2012 | Ottosson .............. | A01K 15/025 119/707 |
| 2012/0240863 A1 | * | 9/2012 | Araujo ..................... | A01K 5/02 119/51.01 |

* cited by examiner

*Primary Examiner* — Trinh Nguyen
(74) *Attorney, Agent, or Firm* — Fishman Stewart PLLC

(57) ABSTRACT

An animal exercise system in the form of a game includes an apparatus comprising an animal transport device; a game board; a plurality of edible game pieces in the form of a treat. In operation, the animal transport device engages and travels along the game board to selectively contact the game pieces. One or more of the game pieces may be fed to the animal as a reward.

2 Claims, 7 Drawing Sheets

| | Keep trying | Good | AMAZING! | Good | Keep trying | |
|---|---|---|---|---|---|---|
| (BACKSTOP) PIN PIN PIN PIN PIN PIN | | | | | | |
| Red Bumper | | | | | | Red Bumper |
| Purple Bumper | | | | | | Purple Bumper |
| Blue Bumper | | | | | | Blue Bumper |
| STARTING LINE | | | | | | |

*FIG. 7*

|  |  |  |  |  |  |  |  |  |  |  |  |  |  | TOTAL |
|---|---|---|---|---|---|---|---|---|---|---|---|---|---|---|
| Hamster Name ........... |  |  |  |  |  |  |  |  |  |  |  |  |  |  |
| Hamster Name ........... |  |  |  |  |  |  |  |  |  |  |  |  |  |  |
| Hamster Name ........... |  |  |  |  |  |  |  |  |  |  |  |  |  |  |

ANIMAL EXERCISE SYSTEM IN FORM OF A GAME

CROSS-REFERENCE TO RELATED APPLICATION

This application is a continuation of U.S. patent application Ser. No. 13/328,443 (U.S. Pat. No. 8,434,428), filed on Dec. 16, 2011. U.S. patent application Ser. No. 13/328,443 claims priority to U.S. Provisional Application Ser. No. 61/424,178 filed on Dec. 17, 2010, the contents of which are both incorporated by reference in their entirety.

TECHNICAL FIELD

The present disclosure refers to an animal exercise system in the form of a game.

BACKGROUND

Animals such as hamsters need daily exercise for good health. Traditionally, animals such as hamsters get exercise by running on a wheel. Exercise wheels, however, provide little interaction between a handler such as a pet owner and the corresponding animal. Accordingly, there is a need for an improved exercise system that provides exercise and enjoyment for both the animal and the handler.

BRIEF DESCRIPTION OF THE DRAWINGS

While the claims are not limited to the illustrated examples, an appreciation of various aspects is best gained through a discussion of various examples thereof. Referring now to the drawings, illustrative examples are shown in detail. Although the drawings represent the exemplary illustrations, the drawings are not necessarily to scale and certain features may be exaggerated to better illustrate and explain an innovative aspect of an embodiment. Further, the specific examples described herein are not intended to be exhaustive or otherwise limiting or restricting to the precise form and configuration shown in the drawings and disclosed in the following detailed description. Exemplary illustrations are described in detail by referring to the drawings, as follows:

FIG. 7 shows an exemplary bowling lane with annotations.

FIG. 8 shows an example of a score card.

DETAILED DESCRIPTION

Figure 1:
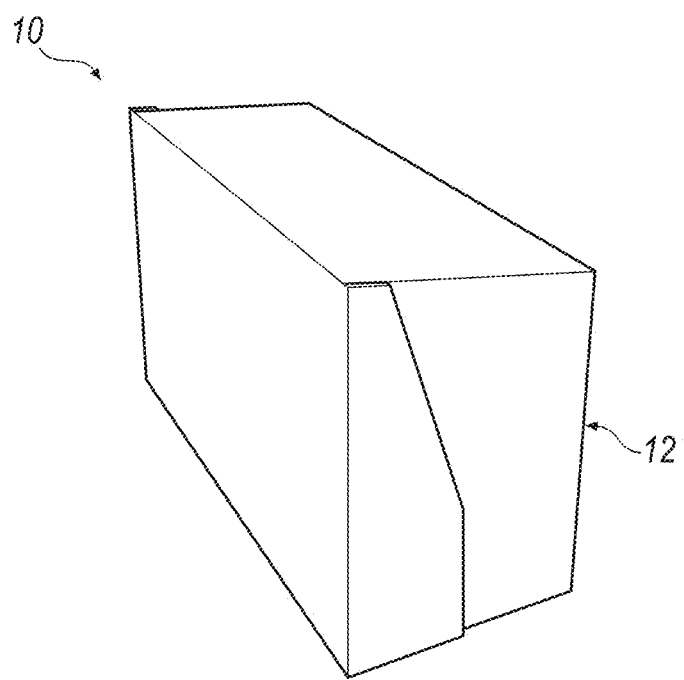
FIG. 1 shows a view of an animal exercise system in a closed orientation as stored in an integral container.

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Hamster "bowling" is a new and different way to exercise an animal such as a hamster—and provides interaction and enjoyment for both the pet and pet owner alike. Hamster bowling differs from regular bowling in that: (1) the animal is placed inside a breathable transport/exercise device such as an exercise ball; (2) the game uses pins that may be edible (e.g., made up of animal friendly edible chew sticks) of a miniature scale; and (3) in the case of the use of edible pins a need for replacement pins is created.

Hamster "bowling" provides a new and innovative way to exercise an animal such as a hamster. It is also a way for pet owners/participants and animals as well as observers watching the game to have fun together.

Physical Components

With reference to FIGS. 1 through 5, in one exemplary approach an animal exercise system 10 includes a container 12 such as a box with a central portion 14 comprising a plurality of side walls 16, 18, 20, and 22 and a bottom wall 24. Two of the side walls may oppose each other and be of a first length generally greater than two adjacent side walls that also oppose each other, but of a second length less than the first length. Thus, the box may be generally rectangular. The bottom wall engages a free end of each side wall. One of the side walls such as side wall 16 having the first length may include a hinged lid 26 at an opposing free end that engages the other three side walls as illustrated. In contrast, opposing side wall 18 may not be secured to adjacent side walls 20 and 22, but it is at least hinged to bottom wall 24. In other approaches it may be secured to the adjacent side walls 20 and 22 such as in the exemplary illustration. In any event, side wall 18 may be used to form a portion of a game board 32 as discussed in greater detail below. In the illustrated example lid 26 includes generally rigid ears 27 secured to an adjacent ear and to a top wall 29 of lid 26 so that container 12 remains securely closed even if side wall 18 were not secured to adjacent side walls 20 and 22. Other types of containers may also be used.

The game pieces may include the following elements:
An animal transport/exercise device 28
Plurality of animal friendly edible chew sticks/edible bowling pins 30
"Bowling" lane 32
Plurality of lane bumpers 34, 26, 38, 40, 42, and 44
Backstop, which in the exemplary illustration is bottom wall 24
Scorecard 44
Replacement pin(s) 30 (animal chew sticks/edible bowling pins)

In one exemplary approach an animal transport/exercise device 28 comprises a spherical ball that is hollow and includes two generally equal hemispheres each having a thin wall with one or more air apertures. An animal such as a hamster may be put into the ball and the ball closed so that the two hemispheres are joined with the animal retained within the interior of the ball. Then, when the animal runs along the inner periphery of the thin wall forming the two hemispheres, the animal projects the ball along different paths along a generally horizontal surface such as a table or a floor. In one example, the exercise ball is approximately five inches in diameter.

As shown in the figures, container 12 itself may form one or more of the game pieces as well as holding the pieces that are distinct from the box itself. For example, it may form the "bowling" lane 32, retain the bumpers, and act as a backstop to stop the exercise ball and animal from rolling too far past the pins.

More specifically, as illustrated in the figures "bowling" lane 32 may be formed from a portion of the container 12 to help facilitate movement and directing of the exercise ball 28 along a desired path. If a cardboard box is used then the lane may also be cardboard. For example, the box may be of a fold out design where the lane "rolls out" when the box is opened. The lane has a rough correspondence to a bowling lane used in traditional bowling. In one example, the lane is approximately 25 inches by 12 inches. The elements of the lane 32 in an illustrative example include side wall 18 and a plurality of panels. In the illustrated approach four panels 48, 52, 56, and 60 are shown, but there could be fewer or a greater number of panels. The panels are sized, however, such that they will fit into container 12 and it can be closed. Thus, the width cannot be any greater than the corresponding width of side walls 18 and 16 or a length greater than one that will fit dimensionally into the container 12 realizing that a panel can be angled into the container such that its length could be a little greater than the first length of side walls 20 and 22. In the illustrated example, the panels have varying lengths to facilitate their insertion into the container 12. As illustrated, a first panel 48 is secured to side wall 18 along a foldable seam 50, a second panel 52 is secured to first panel 48 along a foldable seam 54, a third panel 56 is secured to second panel 52 along a foldable seam 58, and a fourth panel 60 is secured to the third panel 56 along a foldable seam 62. Seams 50, 54, 58, and 62 act as hinges and other mechanisms for hinging may be used. In this example, however, not only are the panels integral with the container 12, but they are unitary or monolithic in the sense that the container and panels are made from the same material and the hinges in the form of seams include the same material. Of course, the seams could be reinforced using other materials while still being monolithic.

Figure 2:
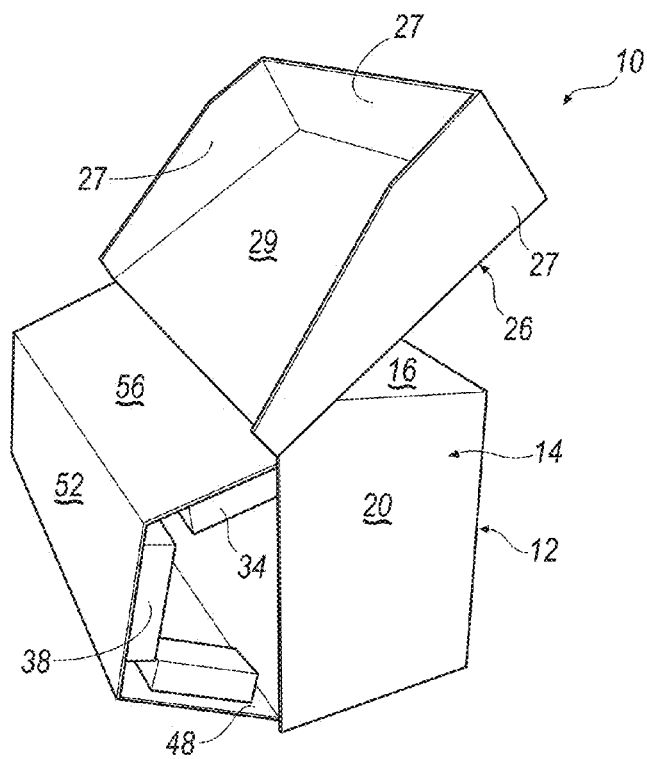
FIG. 2 shows a perspective view of the animal exercise system of FIG. 1 as it is transitioning from a closed orientation toward an operational orientation.
Figure 3:
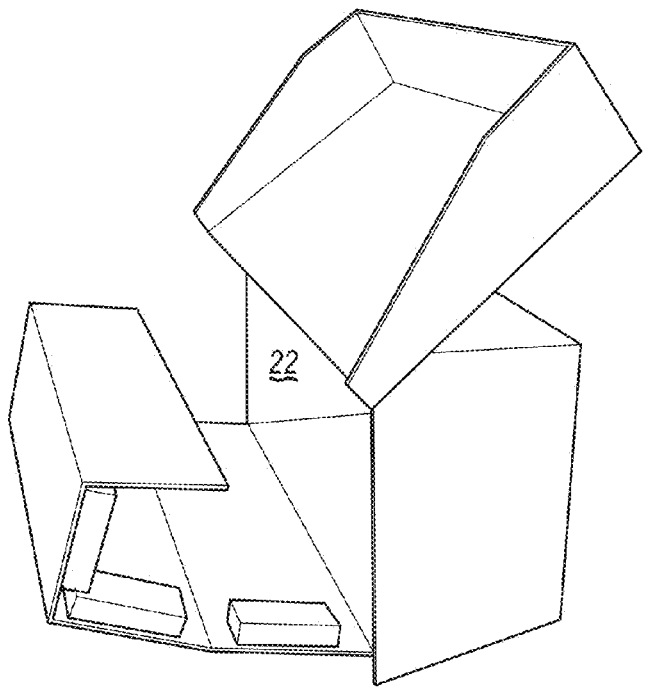
FIG. 3 shows a perspective view of the animal exercise system of FIG. 1 as it is further transitioned from a closed orientation toward an operational orientation.
Figure 4:
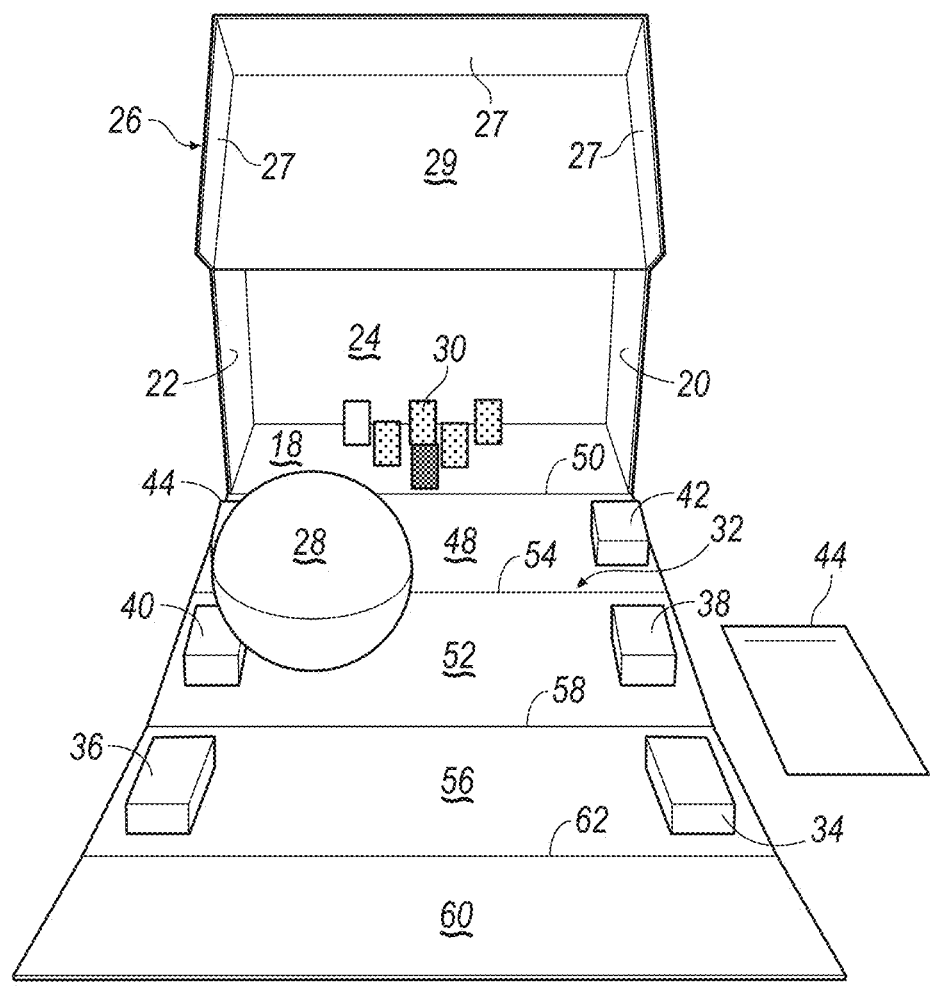
FIG. 4 shows a perspective view of the animal exercise system of FIG. 1 in an operational orientation with an animal transport/exercise device, bowling lane, lane bumpers, backstop and pins.
Figure 5:
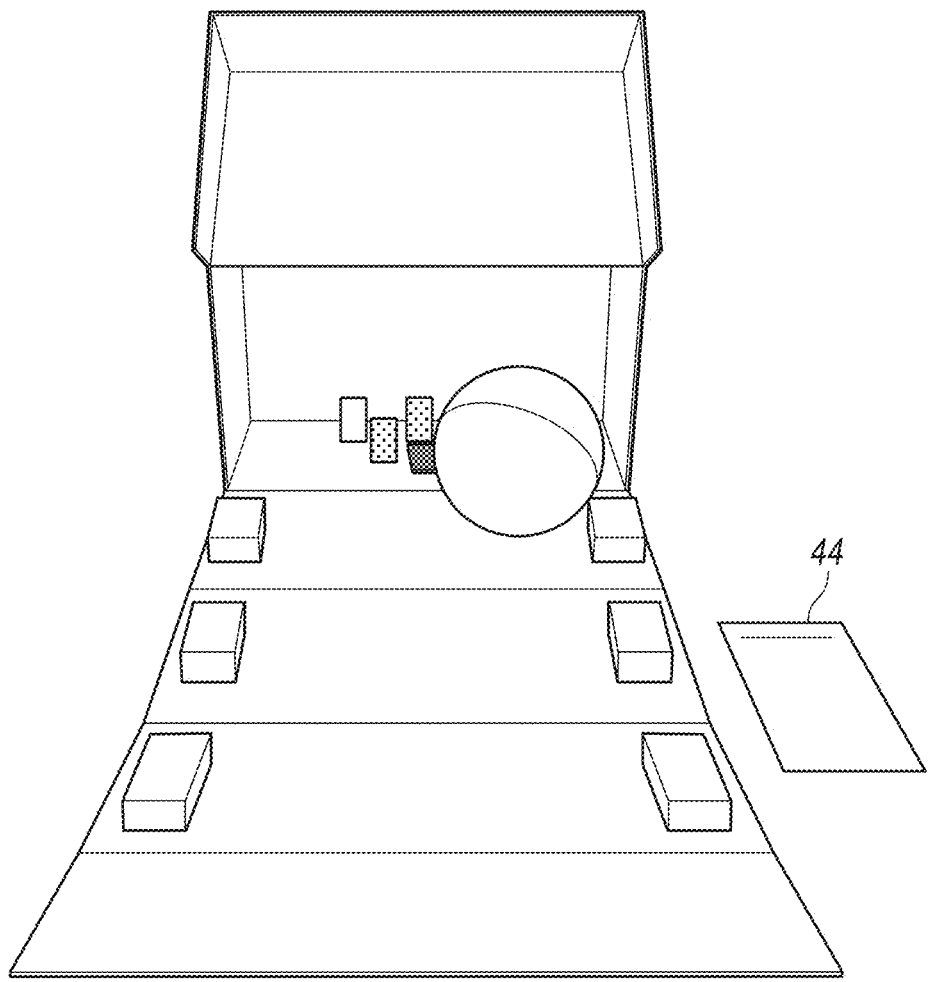
FIG. 5 shows a perspective view of the animal exercise system of FIG. 1 in an operational orientation with an animal transport/exercise device, bowling lane, lane bumpers, backstop and pins, wherein the transport/exercise device has engaged at least one pin and is adjacent a backstop formed within the container.

In FIG. 1 the container 12 is closed. In FIG. 2 the bowling lane 32 is being extracted from the container 12. In FIG. 3, the bowling lane is further extracted from the container 12. In FIGS. 4 and 5 the bowling lane has been fully extracted and is in an operational orientation.

Other approaches to bowling lane 32 may also be possible such as the use of a flexible material that can be rolled into container 12. For example, a separate game board forming lane 32 may be used including one formed from a plastic material that may be "rolled" up without seams.

An exemplary diagram of the bowling lane 32 is shown in FIG. 7 and includes the following annotations: (1) "amazing" to indicate: right down the middle, the animal is headed toward the center kingpin; (2) "good" (to indicate the animal is just barely off the center mark); and (3) "keep trying" (to indicate the animal is near the bumpers, farthest from the king-pin).

System 10 may also include one or more lane bumpers 34, 36, 38, 40, 42, and 44 positioned adjacent side edges of the game board. The bumpers may be formed from a portion of the box or may be separate elements. In one example, a plurality of foam bumpers may be used that may be attached to lane 32 such as by way of a fastening mechanism such as an adhesive. In one illustration six foam bumpers may be used representing three sets of two bumpers each. The bumpers may be of different colors or patterns (e.g., tri-colored). The bumpers should be sized depending on the size of the exercise ball being used. If the exercise ball has an approximately five inch diameter, the bumpers may be roughly two and a half inches by one-half inches (2½×½). The panels 48, 52, and 56 and corresponding bumpers 34, 36, 38, 40, 42, and 44 are both sized and positioned such that the bumpers do not interfere with the seams 50, 54, and 58. As illustrated in FIGS. 4 and 5, the length of bumpers 34 and 38 are shorter than the second dimension of panel 52. This is also illustrated in FIG. 2, where the lane 32 is shown as it transitions from a closed orientation to an operational orientation. Thus, the bumpers are spaced away from the seams so that they do not impede the "rolling" of the board into and out of its stored orientation.

As illustrated in the example of FIG. 7 three sets of foam bumpers 34-44 appear adjacent to the sides of the lane (pre-glued). They are colored as follows: bumpers 34 and 36 are colored "blue" (nearest the starting line, to indicate "coldest"); bumpers 38 and 40 are colored "purple" (in the middle to indicate "getting warmer"; and bumpers 42 and 44 are colored "red" (right near the pins to indicate "hot"). As noted above, an advantage of using small bumper sections on each side (as opposed to one long bumper on each side), is that when the lane forms a portion of the box, the lane can bend easily at the folds and be returned to a box shape for storage.

As also shown in FIG. 7, a first end of the lane 32 represents the starting point or starting line for the exercise ball 28 while an opposing second end includes a backstop to stop an exercise ball from further movement. If the lane is formed as a portion of the box then the backstop may also be a portion of the box such as bottom wall 24 and extend generally vertically away from the lane.

The pins 30 are placed adjacent the backstop on the lane at the second end of the lane. In one exemplary approach the pins are edible and in the form of animal chew sticks or food roughly in the shape of a more traditional bowling pin. The pins 30 include a first end that comes into stable contact with the lane and represents a pivot point such that when placed on the lane for game use, the pin will extend outwardly away from the lane at roughly a right angle. The pin 30, however, is sized and shaped such that when the exercise ball hits a pin, the pin will pivot about the pivot point and fall down, but will not fall down without there being dynamic contact. In one exemplary approach six (6) pins 30 will be used. Moreover, if the animal is a hamster the pins may be one-half inch long and a quarter inch thick (½"×¼")

A purpose of having edible pins 30 is to encourage an animal to enthusiastically participate in playing the game since he/she may be rewarded with the pins upon successful completion of the game.

In one illustration, replacement "pins" 30 will be sold and may be purchased separately. Since the pins are edible chew sticks (and the winning animal may be rewarded with a chew stick after finishing each game), a need for replacement pins will be created.

Use of the scorecard is explained in greater detail below in combination with FIG. 8. However, in one illustration there is a pad with multiple copies of a blank scorecard. As illustrated, moreover, it is envisioned that more than one animal may play the game at the same time such that animals and their handlers compete against each other.

Rules and Method for Playing Game

The ultimate goal of the game is for the animal to achieve the highest score possible and if multiple animals are playing to obtain the highest score as compared to the other hamsters.

Figure 6:
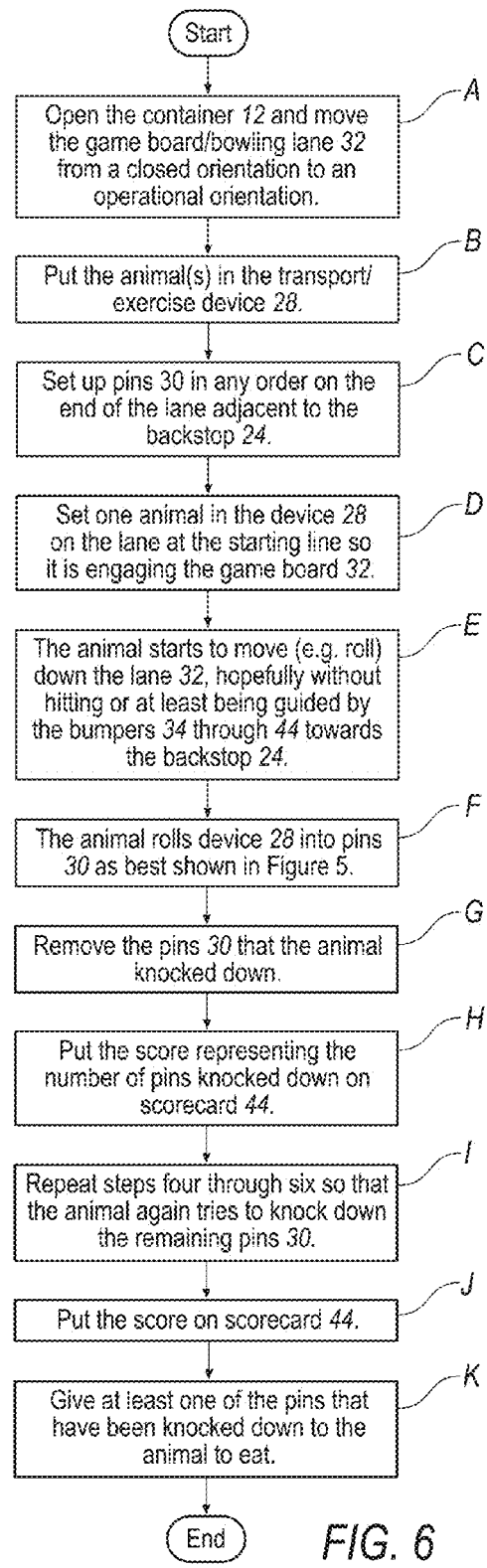
FIG. 6 shows a process diagram giving an example of how the game may be played.

Exemplary Rules shown in the flow chart of FIG. 6 are as follows. First as shown at block A, open the container 12 and move the game board/bowling lane 32 from a closed orientation to an operational orientation as discussed above. Second, as shown in block B, put the animal(s) in the transport/exercise device 28. Third, as shown at block C, set up pins 30 in any order on the end of the lane adjacent the backstop 24. It is envisioned that the pins 30 will be staggered in some manner and generally equally spaced as illustrated in FIG. 7. Alternatively, however, the pins may be positioned to form a generally triangular shape such that when one pin starts to fall down, other pins might also begin to fall down because of contact asserted by the first pin upon an additional pin similar to what happens with a more traditional bowling game pin arrangement. Fourth, as shown in block D, set one animal in the device 28 on the lane at the starting line so it is engaging the game board 32. Fifth, as shown at block E, the animal starts to move (e.g. roll) down the lane 32, hopefully without hitting or at least being guided by the bumpers 34 through 44 towards the backstop 24. Sixth, as shown at block F, the animal rolls device 28 into pins 30 as best exemplified in FIG. 5. Seventh, as shown in block G, remove the pins 30 that the animal knocked down. Eighth, as shown in block H, put the score representing the number of pins knocked down on scorecard 44. Of course, as with any of the illustrative steps, they may be omitted as appropriate. In this case, for example, the score for multiple attempts may be recorded once. Ninth, as suggested at block H, repeat steps D through H so that the animal again tries to knock down the remaining pins 30. Tenth, as shown in block J. put the score on scorecard 44. While two attempts are suggested, fewer or more attempts may be desirable. However, in this example each "turn" consists of two tries to knock down all pins. It is also envisioned that at least once during this process, as represented by Block K, if pins 30 are edible, the animal may be rewarded with one or more of the pins 30 as a reward so that they are motivated to continue to play the game. Eleventh, if one has more than one animal player, repeat steps 2-10 for each animal. Twelfth, continue to record scores until the game is finished. If the scorecard shown in FIG. 8 is used, there will be ten ("10") frames, but without bonus frames. Finally, add up all scores. Whichever animal wins, give him/her a chew stick/edible bowling pin, as a reward (provided).

Safety Note: Place the lane and exercise ball on the floor. Do not place on a table, as the animal may roll off. Also, keep the exercise ball out of direct sunlight, when the animal is inside it.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. An apparatus comprising:
   a container comprising a box having a bottom wall and four side walls, one of said side walls having a length and a height;
   a plurality of panels integral with and extending outwardly from said one of said side walls to form a gameboard, (i) a first panel hinged to a free end of said one of said side walls using a first hinge and having a first dimension roughly equal to said length and a second dimension less than said height, (ii) a second panel hinged to said free end of said first panel using a second hinge and having a first dimension roughly equal to said length and a second dimension less than said second dimension of said first panel, and (iii) a third panel hinged to said free end of said second panel by a third hinge and having a first dimension roughly equal to said length and a second dimension less than said second dimension of said first panel, but greater than said second dimension of said second panel;
   said bottom panel acting as a backstop; and
   a plurality of bumpers positioned on said game board to provide a lane of movement defined by said bumpers from a free end of said third panel and said backstop; and wherein said bumpers do not impede operation of said hinges.

2. An apparatus according to claim 1, further comprising an animal transport device;
   a plurality of edible game pieces in the form of a treat; and
   wherein the animal transport device selectively engages the game board and selectively contacts the game pieces.

* * * * *